(12) United States Patent
Sumi et al.

(10) Patent No.: US 7,944,595 B2
(45) Date of Patent: May 17, 2011

(54) COLOR PROCESSING METHOD AND APPARATUS

(75) Inventors: Naoki Sumi, Kawasaki (JP); Rei Kajihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 11/457,639

(22) Filed: Jul. 14, 2006

(65) Prior Publication Data
US 2007/0019218 A1     Jan. 25, 2007

(30) Foreign Application Priority Data
Jul. 20, 2005   (JP) ................................ 2005-210305

(51) Int. Cl.
    *H04N 1/46*     (2006.01)
    *H04N 1/60*     (2006.01)
(52) U.S. Cl. ........................ 358/525; 358/1.9
(58) Field of Classification Search ............... 358/1.9, 358/525
See application file for complete search history.

(56) References Cited

U.S. PATENT DOCUMENTS
6,494,557 B1 * 12/2002 Kato et al. ..................... 347/19
2002/0181018 A1 * 12/2002 Hung ........................... 358/1.15
2006/0061785 A1    3/2006 Nagoshi et al. .............. 358/1.9

FOREIGN PATENT DOCUMENTS
JP     11-112822     4/1999

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

The dark part of the gamut includes switching regions from light color materials to dark color materials, thus preferable results of colors of these regions cannot be obtained by color prediction based on interpolation. Hence, patches of grid points for dividing an input color space are printed on a medium, and the colorimetry results of the patches are obtained. Patches of some of the grid points and an additional point between these grid points are printed on a medium of the same type as the medium, and the colorimetry results of the patches are obtained. The colorimetric value of the additional point is interpolated based on those of grid points around the additional point in the first colorimetry using, as weights, the distances on the color space between the colorimetric value of the additional point and those of the grid points around the additional point in the second colorimetry.

16 Claims, 7 Drawing Sheets

FIG. 2

| GRID POINT NUMBER | R | G | B | L* | a* | b* |
|---|---|---|---|---|---|---|
| 1 | 0 | 0 | 0 | 5.9 | -1.02 | -5.42 |
| 2 | 0 | 0 | 64 | 9.19 | 4.59 | -23.73 |
| 3 | 0 | 0 | 128 | 11.65 | 12.58 | -39.4 |
| 4 | 0 | 0 | 192 | 14.47 | 23.76 | -54.26 |
| 5 | 0 | 0 | 255 | 16.79 | 35.92 | -67.89 |
| 6 | 0 | 64 | 0 | 15.07 | -20.41 | 1.86 |
| 7 | 0 | 64 | 64 | 16.54 | -14.99 | -21.78 |
| 8 | 0 | 64 | 128 | 20.05 | 6.14 | -49.96 |
| 9 | 0 | 64 | 192 | 22.98 | 15.83 | -62.81 |
| 10 | 0 | 64 | 255 | 24.81 | 19.61 | -69.06 |
| 11 | 0 | 128 | 0 | 23.63 | -40.42 | 8.82 |
| 12 | 0 | 128 | 64 | 24.01 | -37.87 | -11.27 |
| 13 | 0 | 128 | 128 | 25.73 | -25.63 | -31.6 |
| 14 | 0 | 128 | 192 | 29.29 | -3.11 | -57.92 |
| 15 | 0 | 128 | 255 | 33.56 | -3.05 | -65.14 |
| 16 | 0 | 192 | 0 | 32.17 | -59.02 | 17.05 |
| 17 | 0 | 192 | 64 | 33.95 | -63.06 | 2.51 |
| ⋮ | ⋮ | ⋮ | ⋮ | ⋮ | ⋮ | ⋮ |
| 96 | 192 | 255 | 0 | 74.04 | -27.1 | 80.41 |
| 97 | 192 | 255 | 64 | 76.52 | -32.62 | 68.03 |
| 98 | 192 | 255 | 128 | 79.37 | -35.26 | 41.84 |
| 99 | 192 | 255 | 192 | 81.7 | -30.44 | 7.09 |
| 100 | 192 | 255 | 255 | 92.16 | -23 | -23.86 |
| 101 | 255 | 0 | 0 | 45.85 | 68.8 | 49.85 |
| 102 | 255 | 0 | 64 | 44.36 | 70.39 | 34.54 |
| 103 | 255 | 0 | 128 | 43.41 | 72.57 | 16.05 |
| 104 | 255 | 0 | 192 | 42.81 | 75.96 | -3.32 |
| 105 | 255 | 0 | 255 | 42.18 | 81.56 | -24.8 |
| 106 | 255 | 64 | 0 | 54.97 | 59.43 | 61.73 |
| 107 | 255 | 64 | 64 | 56.67 | 56.97 | 41.41 |
| 108 | 255 | 64 | 128 | 55.82 | 60.47 | 16.36 |
| 109 | 255 | 64 | 192 | 54.97 | 66.22 | -6.89 |
| 110 | 255 | 64 | 255 | 54.12 | 75.33 | -32.98 |
| 111 | 255 | 128 | 0 | 65.57 | 42.93 | 74.87 |
| 112 | 255 | 128 | 64 | 66.92 | 38.67 | 57.88 |
| 113 | 255 | 128 | 128 | 68.93 | 37.41 | 24.05 |
| 114 | 255 | 128 | 192 | 68.31 | 44.29 | -2.88 |
| 115 | 255 | 128 | 255 | 67.27 | 54.08 | -28.65 |
| 116 | 255 | 192 | 0 | 77.01 | 22.62 | 89.12 |
| 117 | 255 | 192 | 64 | 78.87 | 17 | 76.01 |
| 118 | 255 | 192 | 128 | 81.01 | 13.79 | 46.74 |
| 119 | 255 | 192 | 192 | 82.41 | 17.66 | 10.01 |
| 120 | 255 | 192 | 255 | 81.58 | 27.44 | -18.51 |
| 121 | 255 | 255 | 0 | 88.18 | 3.47 | 104.15 |
| 122 | 255 | 255 | 64 | 90.04 | -2.34 | 92.07 |
| 123 | 255 | 255 | 128 | 92 | -6.8 | 69.79 |
| 124 | 255 | 255 | 192 | 94.07 | -6.58 | 34.09 |
| 125 | 255 | 255 | 255 | 95.93 | 0.04 | -4.81 |

COLOR PROCESSING METHOD AND APPARATUS

BACKGROUND OF THE INVENTION

1. Field of the Invention

The present invention relates to color processing for generating a color conversion table for a printer.

1. Description of the Related Art

An image output device such as a printer or the like performs color conversion of a color space (to be referred to as "input color space" hereinafter) of image data input from an image input device into a color space (to be referred to as "output color space" hereinafter) of the output device using a lookup table (LUT) or the like upon outputting an image.

When the LUT is generated, the gamut of the output device must be colorimetrically measured for mapping processing onto the gamut. Taking a printer as an example, input signals (patch data) which are divided to have values at equal intervals are generated to print patches on a print sheet based on the patch data, and the patches are colorimetrically measured. In this way, the chromaticities of outputs corresponding to the input signals on grid points can be detected. In order to detect a chromaticity corresponding to an input signal which is not located on a grid point, known interpolation processing such as linear interpolation, tetrahedral interpolation, cubic interpolation, or the like is done to predict that chromaticity value.

FIG. 1 is a view for explaining the sequence for performing linear interpolation of a chromaticity value corresponding to an input signal which is not located on a grid point.

Referring to FIG. 1, a point G1 is a grid point having an input RGB value=(0, 0, 128), and a point G2 is a grid point having an input RGB value=(0, 0, 64). The chromaticity (Lab value as output value) of a point P located at the middle of these grid points G1 and G2, i.e., that having an input RGB value (0, 0, 96), is calculated. Note that the output value of the grid point G1 is (L1, a1, b1), and that of the grid point G2 is (L2, a2, b2).

As shown in FIG. 1, the point P is located at the middle of the grid points G1 and G2, and a distance d1 between the grid point G1 and point P is equal to a distance d2 between the grid point G2 and point P (d1:d2=1:1). Therefore, the chromaticity (Lp, ap, bp) of the point P is calculated using the ratio of the distances as a weight as follows:

$Lp=\{(L1 \times d2)+(L2 \times d1)\}/(d1+d2)$ $ap=\{(a1 \times d2)+(a2 \times d1)\}/(d1+d2)$ $bp=\{(b1 \times d2)+(b2 \times d1)\}/(d1+d2)$ As described by the above equations, the output value of the point P is calculated by giving a larger weight to output values of closer grid points. Since d1:d2=1:1 in the example shown in FIG. 1, the above equations can be rewritten by:

$Lp=(L1+L2)/2$ $ap=(a1+a2)/2$ $bp=(b1+b2)/2$

These equations are equivalent to those which simply calculate the average values of the output values of the grid points G1 and G2.

In this way, the linear interpolation calculates the output value of a given input point by simple calculations using the output values of a plurality of grid points that sandwich the input point, and the distances between the input point and the grid points.

FIG. 2 shows an example between the correspondence between the input RGB values of 125 grid points obtained by dividing input signals at equal intervals and the Lab values of colorimetry results. The input RGB values have five stages in 64-increments, and the number of data is $5^3=125$. When the grid intervals are halved by setting the input RGB values in 32-increments (nine stages), the number of data increases to $9^3=729$. In this case, when the linear interpolation is used, the output value of a new grid point can be calculated as the average of the output values of two grid points included in the 125 grid points.

Accurate mapping can be done with increasing number of pieces of chromaticity information of the gamut of a device. However, in order to obtain pieces of chromaticity information that can cover all the gamut of the device, a huge number of patches must be printed and colorimetrically measured, resulting in impractical processing. Hence, in order to increase the number of pieces of chromaticity information of the gamut of the device, the aforementioned interpolation technique is used.

Meanwhile, a thermal head printer or the like can hardly form patches having the same chromaticities due to accumulation of heat in a print head or the like even when it receives and print identical data. As a result, if such patches are colorimetrically measured, it is difficult to obtain the colorimetric values of the strictly same results. By merely replacing the arrangement order of patches or changing the patch size (area), colorimetric values often change largely. Not only with the thermal head printer but also with an electrophotographic printer, when patches are separately printed on a plurality of charts and are colorimetrically measured, for example, colorimetric values are often different on the first and second sheets.

Therefore, data obtained by separately printing patches on a plurality of charts and joining their colorimetry results have poor reliability. That is, it is desirable to print patches used to measure the gamut of the output device on a single chart (print sheet).

Japanese Patent Laid-Open No. 11-112822 discloses the following technique. That is, patches are printed by a printer and are colorimetrically measured, and CMY coordinate values corresponding to RGB grid points are estimated by linear interpolation using their correspondence. Then, RGB grid points are calculated by nonlinear interpolation based on the estimated CMY coordinate values, and the estimated CMY coordinate values are corrected by subtracting the differences of the RGB grid points, thus obtaining the CMY coordinate values accurately corresponding to the RGB grid points.

In this way, by obtaining pieces of chromaticity information of the gamut of the output device as much as possible, accurate mapping can be done. However, when the output device prints using dark color materials and light color materials, a dark part of the output color space includes switching regions from light color materials to dark color materials, mixture regions of a plurality of color materials, and the like. Preferred prediction results of colors of such regions cannot be obtained by the above color prediction based on interpolation. Note that the dark color materials include, e.g., color materials of cyan, magenta, yellow, and black, and the light color materials include, e.g., color materials of light magenta and light cyan.

Especially, in the thermal head printer, in order to prevent changes in color due to heat accumulation, it is desirable to print patches on a single print sheet, and an increase in the number of pieces of chromaticity information is not easy.

SUMMARY OF THE INVENTION

The first aspect of the present invention discloses a color processing method comprising the steps of: generating patch data corresponding to grid points obtained by dividing an input color space, supplying the patch data to a target printer, printing patches corresponding to the respective grid points on a print medium, and obtaining colorimetry results of the patches; generating patch data corresponding to some of the grid points and an additional point between these grid points, supplying the patch data to the target printer, printing patches corresponding to the some grid points and the additional point on a print medium of the same type as the print medium, and obtaining colorimetry results of the patches; and making an interpolation calculation of a colorimetric value of the additional point based on colorimetric values of grid points around the additional position in the colorimetry results in the first step using, as weights, distances on the color space between the colorimetric value of the additional point and the colorimetric values of grid points around the additional point in the colorimetry results in the second step.

The second aspect of the present invention discloses a color processing method comprising the steps of: generating patch data corresponding to grid points obtained by dividing an input color space, supplying the patch data to a target printer, printing patches corresponding to the respective grid points on a print medium, and obtaining colorimetry results of the patches; generating patch data corresponding to some of the grid points and an additional point between these grid points, supplying the patch data to the target printer, printing patches corresponding to the some grid points and the additional point on a print medium of the same type as the print medium, and obtaining colorimetry results of the patches; and making an interpolation calculation of a colorimetric value of the additional point based on colorimetric values of grid points around the additional position in the colorimetry results in the first step using, as weights, differences between components of the colorimetric value of the additional point and components of the colorimetric values of grid points around the additional point in the colorimetry results in the second step.

The third aspect of the present invention discloses an image processing method comprising the steps of: printing first patch data corresponding to grid points obtained by dividing an input color space, and second patch data corresponding to at least two of the grid points and a point between the at least two grid points on another print medium of the same type; obtaining first colorimetry results of patches corresponding to the first patch data, and second colorimetry results of patches corresponding to the second patch data; and estimating a colorimetric value of the point between the at least two grid points, which cannot be obtained from the first colorimetry results, based on the obtained second colorimetry results.

According to the present invention, the colorimetric value of a point between grid points can be accurately predicted from those of patches at grid points.

Further features of the present invention will be become apparent from the following description of exemplary embodiments with reference to the attached drawings.

BRIEF DESCRIPTION OF THE DRAWINGS

FIG. 2 shows an example of the input RGB values of 125 grid points obtained by dividing input signals at equal intervals and the Lab values of colorimetry results;

DESCRIPTION OF THE EMBODIMENTS

Color processing according to preferred embodiments of the present invention will be described in detail hereinafter with reference to the accompanying drawings.

First Embodiment

In the following description, assume that the number of patches which can be printed (or can be colorimetrically measured) on a single print sheet is 125 so as to obtain pieces of chromaticity information (Lab values) of respective grid points of the gamut of a printer. Processing for obtaining pieces of chromaticity information corresponding to 729 grid points by increasing the number of grid points after the 125 patches are colorimetrically measured will be described below.

Figure 3:
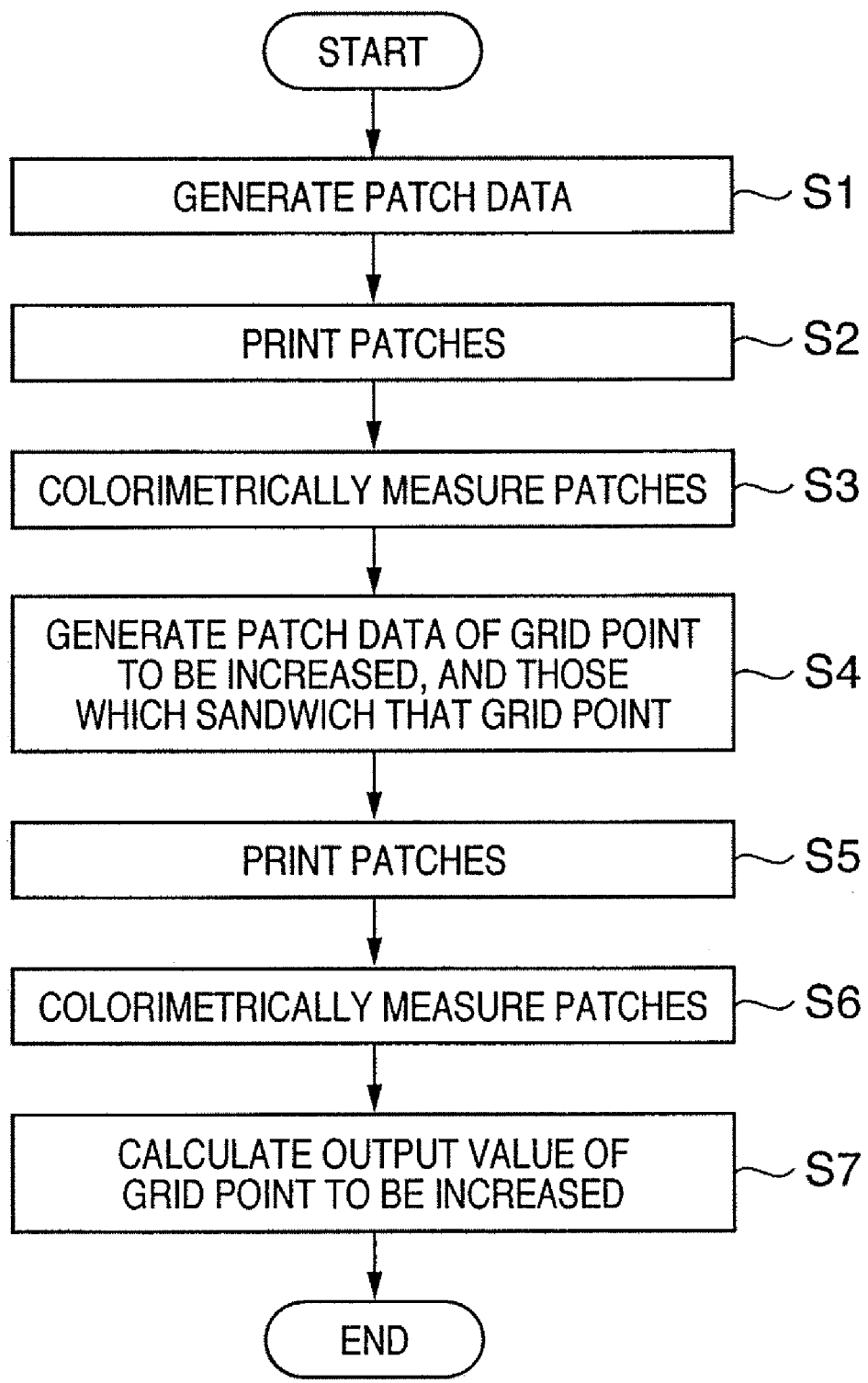
FIG. 3 is a flowchart for explaining the processing for generating a color conversion LUT.

FIG. 3 is a flowchart for explaining the processing for generating a color conversion LUT.

Initially, patch data obtained by dividing an input color space (expressed by input RGB signals (8 bits per color)) into five stages at equal intervals in 64-increments are generated (S1). These patch data are color-separated and $5^3=125$ patches are printed on a print sheet (S2), and the printed patches are colorimetrically measured (S3). With this colorimetry, a table indicating the relationship between the input RGB values corresponding to the 125 grid points, and Lab values of the colorimetry results (FIG. 2) is obtained. Note that a column on the left end in FIG. 2 indicates grid point numbers, left three columns indicate input RGB values, and right three columns indicate colorimetric values (Lab values) of the patches corresponding to the input RGB values. The data format shown in FIG. 2 is generally called a lookup table (LUT), which indicates correlation of chromaticities (Lab values) of the device with respect to the input color space. As the number of grid points (sets of data) of this table is larger, more accurate output values can be obtained upon mapping.

However, as described above, the dark part of the output color space includes, e.g., switching regions from light color materials to dark color materials, mixture regions of a plurality of color materials, and the like, and preferred prediction results cannot be obtained by the above color prediction based on interpolation in these regions. The processing for solving this problem will be described below. As an example, calculations of the Lab value of a point P having an input RGB value (0, 0, 96) which is located at the middle of a grid point G1 having an input RGB value=(0, 0, 128) and a grid point G2 having an input RGB value=(0, 0, 64) will be explained. Note that the colorimetry results of the grid points G1 and G2 are obtained in step S3.

Patch data including the input RGB signals of at least the grid points G1 and G2 and the point P are generated (S4), and the patch data are color separated and are printed on another print sheet of the same type (S5). In this way, when patches including middle points of the 125 grid points obtained in step S3 are printed to have 125 patches or less per print sheet, they are separately printed on about six print sheets.

Next, the patches printed in step S5 are colorimetrically measured (S6). The colorimetry result of the point P is (Lp', ap', bp') On the other hand, the colorimetry results of the grid points G1 and G2 in step S3 are (L1, a1, b1) and (L2, a2, b2), while those in step S6 are different from the results in step S3, i.e., (L1', a1', b1') and (L2', a2', b2'). That is, assume that the colorimetric values of the same results cannot be obtained due to the aforementioned cause.

Figure 4:
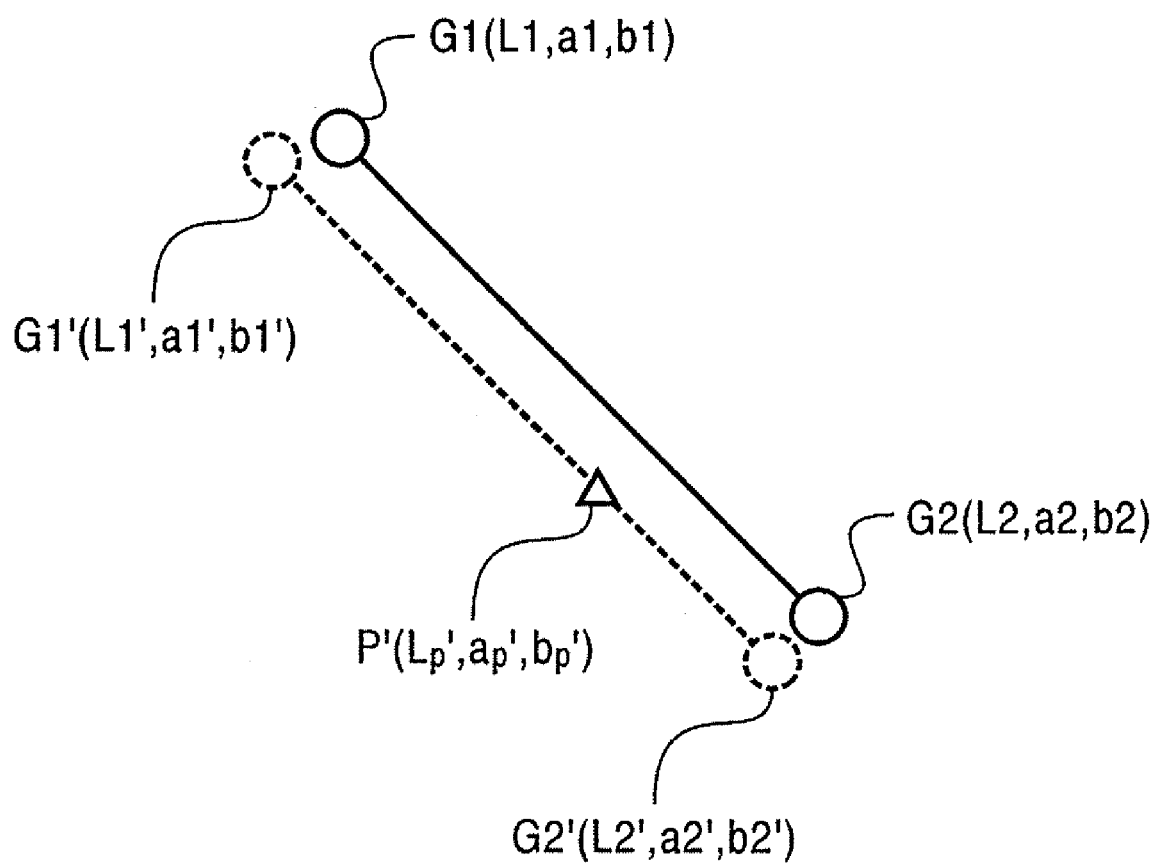
FIG. 4 shows the difference between the colorimetry results.
Figure 5:
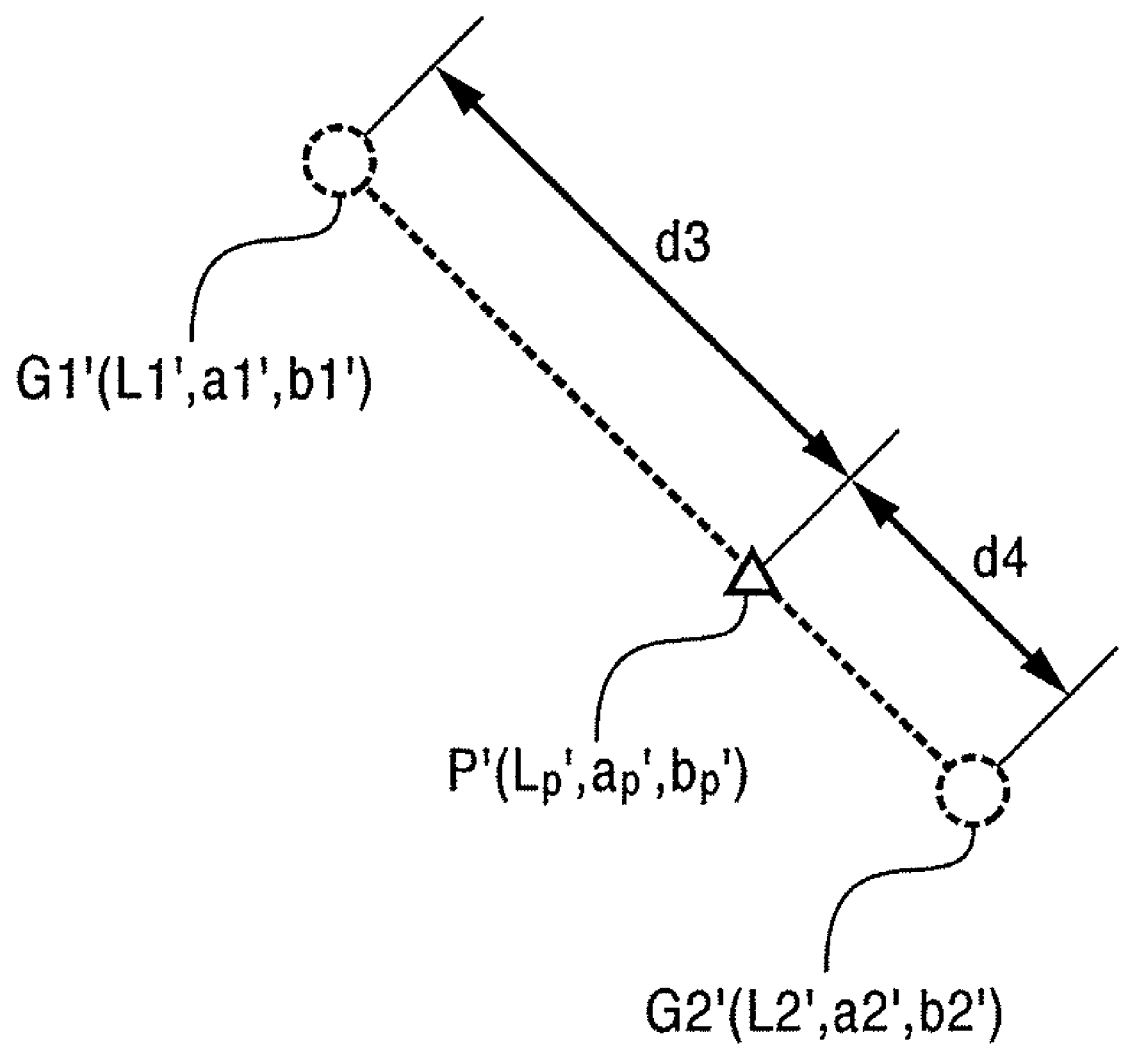
FIG. 5 shows distances d3 and d4 between grid points G1 and G2 and a point P.

FIG. 4 shows this difference between the colorimetry results. That is, the colorimetry results in step S6 have a state indicated by the broken line with respect to those in step S3 indicated by the solid line. FIG. 5 shows distances d3 and d4 between the grid points G1 and G2, and the point P by paying attention to the colorimetry results in step S6.

Figure 6:
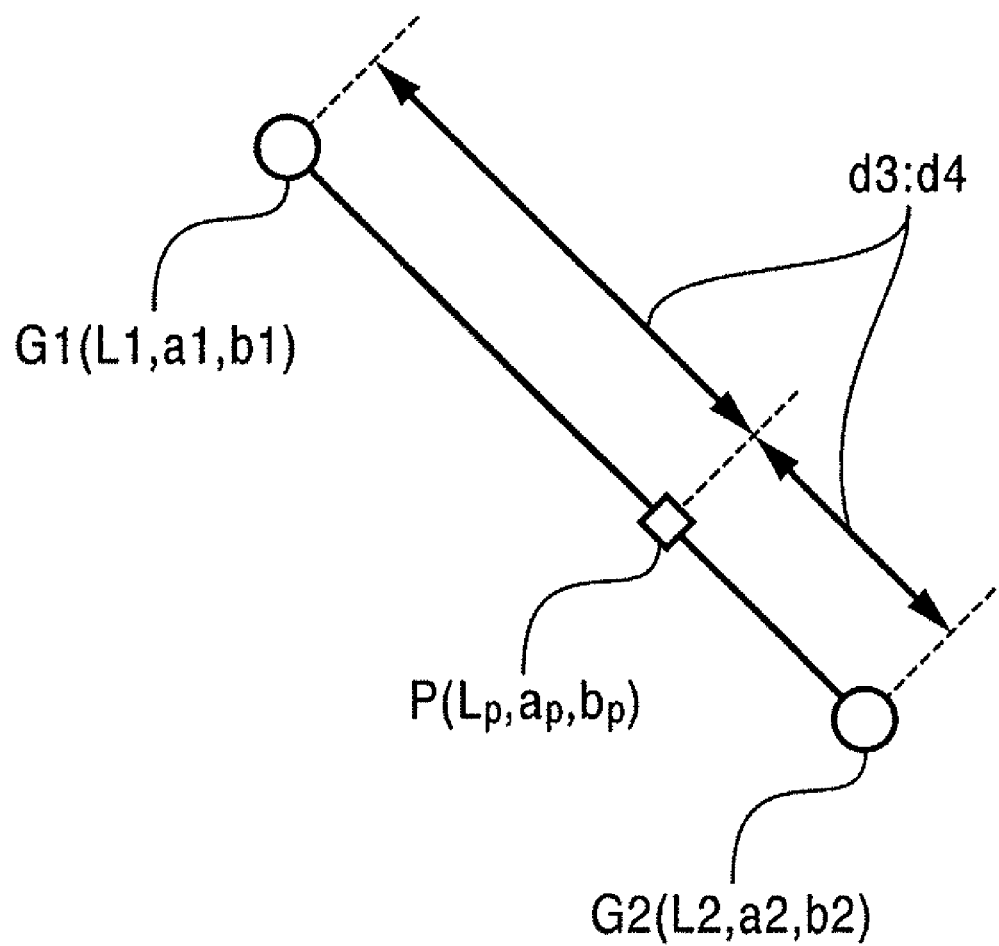
FIG. 6 is a view showing a calculation state of the output value of the point P.

Using the distances d3 and d4 obtained from the colorimetry results in step S6, and the colorimetry results in step S3, accurate chromaticity information of the point P is calculated (S7). FIG. 6 shows a calculation state of the output value of the point P by applying the distances d3 and d4 obtained from the colorimetry results in step S6 to the measurement results in step S3.

$$Lp\{(L1 \times d4)+(L2 \times d3)\}/(d3+d4)$$

$$ap=\{(a1 \times d4)+(a2 \times d3)\}/(d3+d4)$$

$$bp=\{(b1 \times d4)+(b2 \times d3)\}/(d3+d4)$$

where d3 is the distance between G1 and P in the colorimetry results in step S6, and d4 is the distance between G2 and P in the colorimetry results in step S6.

As described above, even when the first and second print sheets are of the same type, and the same patch data are used, the same colorimetric values are more unlikely to be obtained. On the other hand, the relationship among the patches (G1, G2, P) on the second print sheet are relatively reliable since these patches are printed on a single print sheet. Using the relationship among the colorimetric values of G1, G2, and P on the second print sheet as materials upon calculating the colorimetric value corresponding to the point P which is not formed on the first sheet by interpolation, interpolation with high accuracy can be made.

Figure 1:
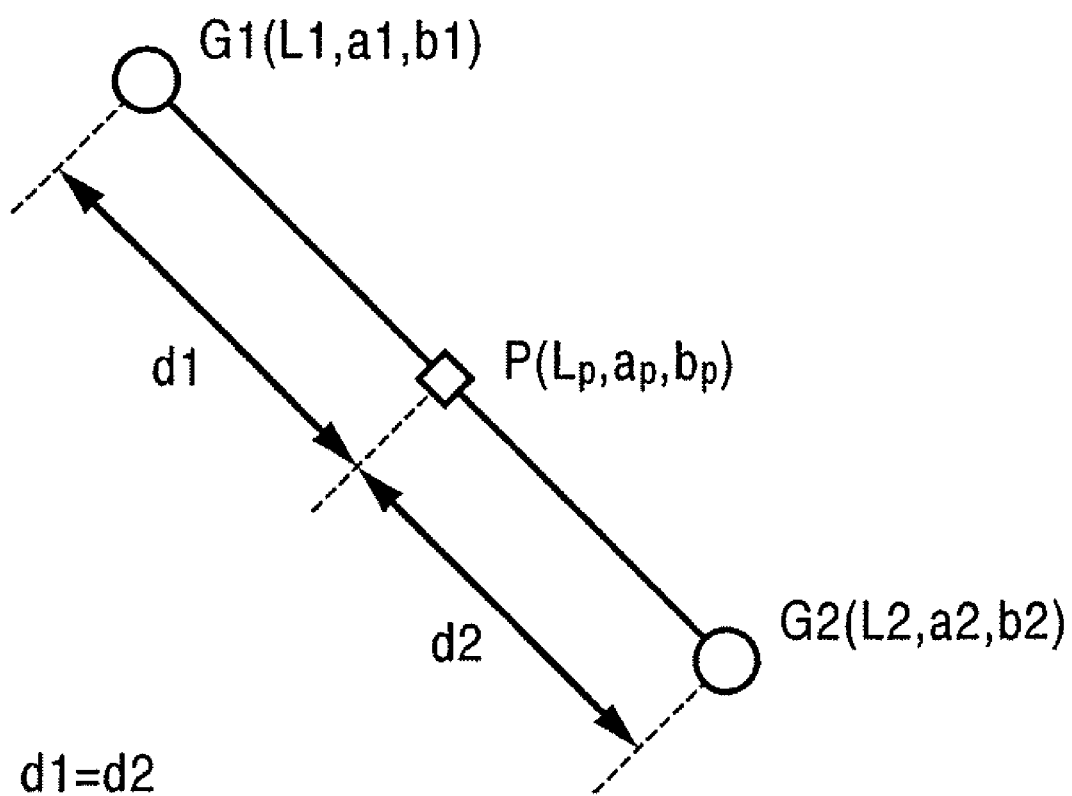
FIG. 1 is a view for explaining the sequence for performing linear interpolation of a chromaticity corresponding to an input signal which is not located on a grid point.

When the interpolation method shown in FIG. 1 is applied, regions with high accuracy and those with poor accuracy exist. Especially, the dark side of the gamut includes switching points from light color materials to dark color materials, and mixture regions of a plurality of color materials, and there are many poor accuracy regions. Hence, when the interpolation method shown in FIG. 6 is applied to the regions on the dark side of the gamut, and other regions undergo linear interpolation shown in FIG. 1, the number of print sheets to be printed including the patches of the grid points to be increased can be reduced.

For example, a method that prints patches including middle grid points associated with a value "32", and does not print middle grid points associated with values "96", "160", and "225" can be adopted for the regions on the dark side. With this method, three stages of printing of grid points "0" and "164" which sandwich middle grid points "32" are to be executed, and $3^3=27$ patches need only be printed. Therefore, steps S4 to S6 can be implemented by the processing for a single print sheet, and the need of colorimetry can be cut out. Likewise, if the middle grid points are "32" and "96", $5^3=125$ patches need only be printed, and the above steps can also be implemented by the processing for a single print sheet. Of course, in step S7, in this case, the output values of the grid points to be increased for the regions on the dark side are calculated by the interpolation method shown in FIG. 6, and those of the grid points to be increased for other regions are calculated by the interpolation method (simple linear interpolation or the like) shown in FIG. 1.

In this way, when the colorimetric value of 125 grid points are increased to those of 729 grid points, the output values of the 125 grid points printed on the first sheet need not be changed. Furthermore, the colorimetric values (chromaticity information) of grid points to be increased undergo color prediction by the method with higher accuracy in place of that based on simple linear interpolation, thus obtaining preferred prediction results.

[Arrangement of Apparatus]

Figure 7:
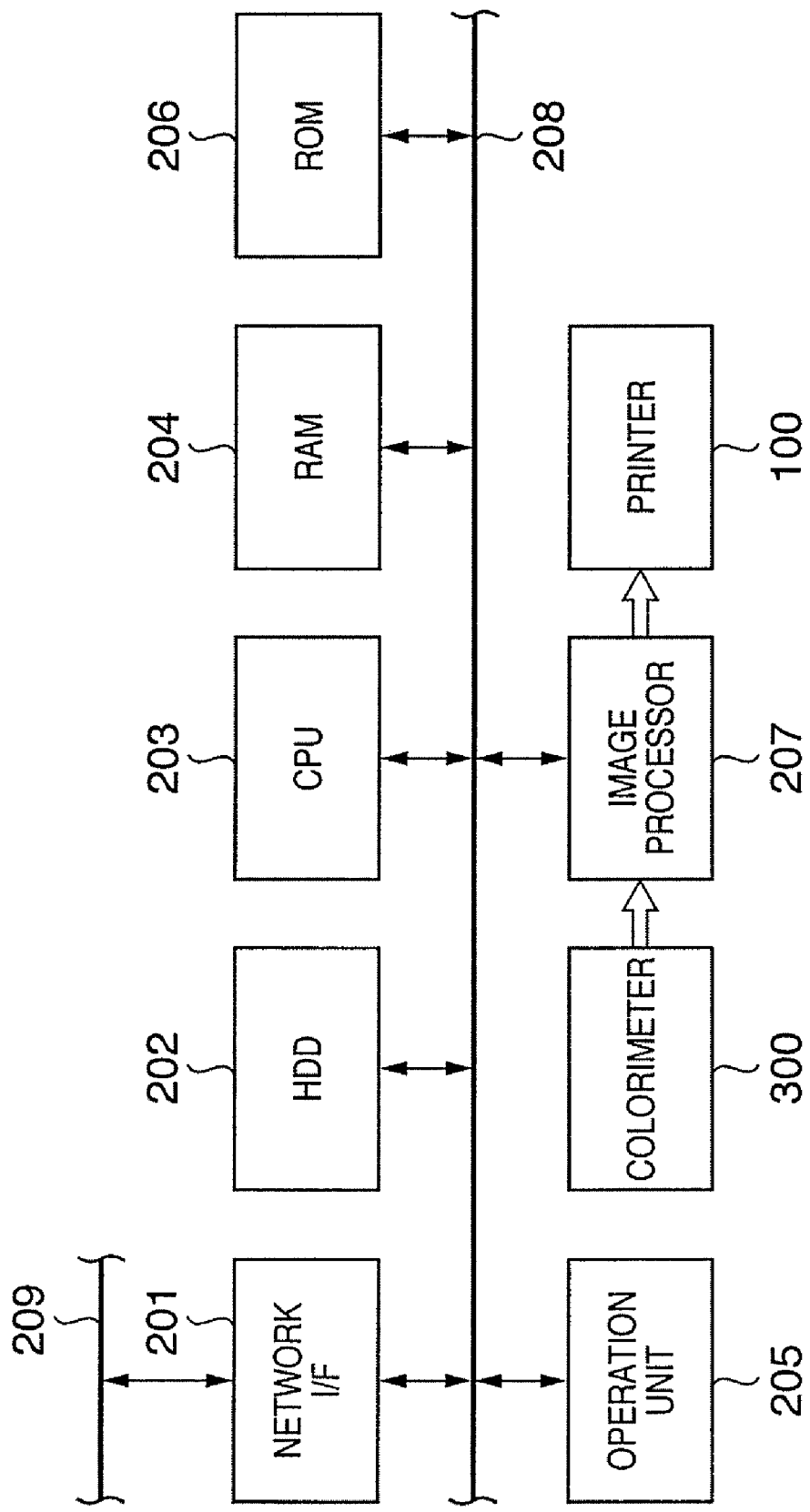
FIG. 7 is a block diagram showing the arrangement of an image processing apparatus which performs color processing shown in FIG. 3.

FIG. 7 is a block diagram showing the arrangement of an image processing apparatus which implements the color processing shown in FIG. 3.

A CPU 203 executes programs stored in a ROM 206 and a hard disk drive (HDD) 202 using a RAM 204 as a work memory and controls other components via a system bus 208. Then, the CPU 203 executes various kinds of processing including that shown in FIG. 3.

More specifically, the CPU 203 generates patch data, as shown in FIG. 3, based on grid point information stored in the HDD 202, supplies the patch data to an image processor 207, which controls a target printer 100 (ink-jet printer or electrophotographic printer) to print patches. The printed patches are colorimetrically measured by a colorimeter 300, and the colorimetry results are stored in the HDD 202. In this case, color separation processing for the target printer is set in the image processor 207.

The CPU 203 stores a completed color conversion table in the HDD 202 or a server connected to a network 209 via a network interface (I/F) 201. Also, the CPU 203 may obtain the grid point information or patch data themselves from a server on the network 209.

[Modification]

In the above description, d3 is the distance between G1 and P, and d4 is that between G2 and P. However, when distances for respective components are considered as follows, more accurate output values can be obtained. That is, by deriving (Lp, ap, bp) which meet:

Distance between L1' and Lp': distance between L2' and Lp'=distance between L1 and Lp: distance between L2 and Lp Distance between a1' and ap': distance between a2' and ap'=distance between a1 and ap: distance between a2 and ap Distance between b1' and bp': distance between b2' and bp'=distance between b1 and bp: distance between b2 and bp output values with higher accuracy can be obtained for respective components.

In the above description, the output value of the point P is calculated using those of two grid points which sandwich the point P and the distances between them. Alternatively, four grid points around the point P may be selected, and the output value of the point P may be calculated using the output values of the point P and these grid points and the distances between them.

In the above description, basic patches (125 points) are printed on the first print sheet, and auxiliary patches of grid points to be increased (e.g., middle grid points) are printed on the second and subsequent print sheets by adding some of the basic patches. Furthermore, when the number of print sheets to be printed is increased like the third sheet, fourth sheet, and so forth, and the interpolation method of FIG. 6 is applied, the accuracy of chromaticity information indicating the gamut of the printer can be increased in correspondence with the number of sheets to be printed without printing all required patches on a single print sheet although the need of colorimetry increases.

The positions of grid points to be increased are not limited to the middle positions of basic grid points corresponding to the basic patches. Although processing becomes somewhat complicated, grid points at arbitrary positions between basic grid points may be added, and the interpolation method shown in FIG. 6 may be applied.

FIG. 3 separately shows generation, printing, and colorimetry of basic patches (S1 to S3), and generation, printing, and colorimetry of auxiliary patches (S4 to S6). Alternatively, generation, printing, and colorimetry of basic patches and auxiliary patches may be done together.

The aforementioned processing can be summarized as follows.

(1) First patch data (125 basic patches) corresponding to grid points obtained by dividing an input color space (8 bits for each of RGB) in predetermined increments are printed on a first print medium.

(2) Second patch data corresponding to at least two (corresponding to G1 and G2 in FIG. 4) of the above grid points and a point (P in FIG. 4) between the at least two grid points are printed on another print medium of the same type as the first print medium.

(3) First colorimetry results of patches corresponding to the first patch data, and second colorimetry results of patches corresponding to the second patch data are obtained.

(4) Based on the obtained second colorimetry results, the colorimetric value of the point between the at least two grid points, which cannot be obtained from the first colorimetry results, is estimated.

With these steps (1) to (4), the above-described switching regions from light color materials to dark color materials and mixture regions of a plurality of color materials can be estimated (calculated) with higher accuracy.

In this way, even in regions with poor interpolation accuracy of the gamut of the printer, color prediction with high accuracy can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-210305, filed Jul. 20, 2005, which is hereby incorporated by reference herein in its entirety.

What is claimed is:

1. A color processing method comprising:
using a processor to perform the steps of:
generating patch data corresponding to grid points obtained by dividing an input color space, supplying the patch data to a target printer to print a plurality of first patches corresponding to the respective grid points on a print medium, and obtaining colorimetry results of the plurality of first patches;
generating patch data corresponding to some of the grid points and an additional point between these grid points, supplying the patch data to the target printer to print a plurality of second patches corresponding to the some grid points and the additional point on a print medium of the same type as the print medium used for printing the plurality of first patches, and obtaining colorimetry results of the plurality of second patches, wherein the some of the grid points are included in a region of the input color space where a desirable color prediction is not obtained by a linear interpolation using the colorimetry results of the plurality of first patches; and
performing an interpolation calculation to obtain a colorimetric value of the additional point, based on colorimetric values of grid points around the additional point in the colorimetry results of the plurality of first patches using, as weights, distances on the color space between the colorimetric value of the additional point and the colorimetric values of grid points around the additional point in the colorimetry results of the plurality of second patches.

2. The method according to claim 1, wherein the region exists in a dark side of the input color space.

3. The method according to claim 1, further comprising using the processor to perform the step of performing an interpolation calculation to obtain a colorimetric value of an additional point between the grid points included in a region on a bright side of the input color space based on colorimetric values of grid points around the additional point.

4. The method according to claim 1, further comprising using the processor to perform the step of generating a color conversion table for the target printer based on the colorimetry results of the plurality of first patches and a calculation result of the interpolation calculation.

5. The method according to claim 1, wherein the first step includes a step of setting the grid points by equally dividing the input color space.

6. A color processing method comprising:
using a processor to perform the steps of:
generating patch data corresponding to grid points obtained by dividing an input color space, supplying the patch data to a target printer to print a plurality of first patches corresponding to the respective grid points on a print medium, and obtaining colorimetry results of the plurality of first patches;
generating patch data corresponding to some of the grid points and an additional point between these grid points, supplying the patch data to the target printer, to print a plurality of second patches corresponding to the some grid points and the additional point on a print medium of the same type as the print medium used for printing the plurality of first patches, and obtaining colorimetry results of the plurality of second patches, wherein the some of the grid points are included in a region of the input color space where a desirable color prediction is not obtained by a linear interpolation using the colorimetry results of the plurality of first patches; and
performing an interpolation calculation to obtain a colorimetric value of the additional point, based on colorimetric values of grid points around the additional point in the colorimetry results of the plurality of first patches using, as weights, differences between components of the colorimetric value of the additional point and components of the colorimetric values of grid points around the additional point in the colorimetry results of the plurality of second patches.

7. The method according to claim 6, wherein the region exists in a dark side of the input color space.

8. The method according to claim 6, further comprising using the processor to perform the step of performing an interpolation calculation to obtain a colorimetric value of an additional point between the grid points included in a region on a bright side of the input color space based on colorimetric values of grid points around the additional point.

9. The method according to claim 6, further comprising using the processor to perform the step of generating a color conversion table for the target printer based on the colorimetry results of the plurality of first patches and a calculation result of the interpolation calculation.

10. The method according to claim 6, wherein the first step includes a step of setting the grid points by equally dividing the input color space.

11. A color processing method comprising:
using a processor to perform the steps of:
obtaining first measurement results of a first print medium on which a plurality of first patches corresponding to first patch data that respectively correspond to grid points obtained by dividing an input color space are formed;
obtaining second measurement results of a second print medium of the same type as the first print medium on which a plurality of second patches corresponding to some of the grid points and an additional point between these grid points are formed, wherein the some of the grid points are included in a region of the input color space where a desirable color prediction is not obtained by a linear interpolation using the first measurement results; and
performing an interpolation calculation to obtain a measurement result of the additional point, based on measurement results of grid points around the additional point in the first measurement results using, as weights, differences between components of the measurement result of the additional point and components of the measurement results of the grid points around the additional point in the second measurement results.

12. A color processing apparatus comprising:
a generator, arranged to generate patch data, and to supply the patch data to a printer to make the printer print patches on a print medium;
an obtainer, arranged to make said generator generate first patch data corresponding to grid points obtained by dividing an input color space and second patch data corresponding to some of the grid points and an additional point between these grid points, and to supply the first patch data and the second patch data to a target printer to make the target printer print a plurality of first patches corresponding to the first patch data and a plurality of second patches corresponding to the second patch data on another print medium of the same type, and to obtain first colorimetry results of the plurality of first patches and second colorimetry results of the plurality of second patches, wherein the some of the grid points are included in a region of the input color space where a desirable color prediction is not obtained by a linear interpolation using the first colorimetry results; and
a calculator, arranged to perform an interpolation calculation to obtain a colorimetric value of the additional point, based on colorimetric values of grid points around the additional point in the first colorimetry results using, as weights, differences between the colorimetric value of the additional point and the colorimetric values of grid points around the additional point in the second colorimetry results.

13. A color processing apparatus comprising:
a generator, arranged to generate patch data, and to supply the patch data to a printer to make the printer print patches on a print medium;
an obtainer, arranged to make said generator generate first patch data corresponding to grid points obtained by dividing an input color space and second patch data corresponding to some of the grid points and an additional point between these grid points, and to supply the first patch data and the second patch data to a target printer to make the target printer print a plurality of first patches corresponding to the first patch data and a plurality of second patches corresponding to the second patch data on another print medium of the same type, and to obtain first colorimetry results of the plurality of first patches and second colorimetry results of the plurality of second patches, wherein the some of the grid points are included in a region of the input color space where a desirable color prediction is not obtained by a linear interpolation using the first colorimetry results; and
a calculator, arranged to perform an interpolation calculation to obtain a colorimetric value of the additional point, based on colorimetric values of grid points around the additional point in the first colorimetry results using, as weights, differences between components of the colorimetric value of the additional point and components of the colorimetric values of grid points around the additional point in the second colorimetry results.

14. A non-transitory computer-readable medium storing a computer-executable program for causing a computer to perform a color processing method, the method comprising the steps of:
generating patch data corresponding to grid points obtained by dividing an input color space, supplying the patch data to a target printer to print a plurality of first patches corresponding to the respective grid points on a print medium, and obtaining colorimetry results of the plurality of first patches;
generating patch data corresponding to some of the grid points and an additional point between these grid points, supplying the patch data to the target printer to print a plurality of second patches corresponding to the some grid points and the additional point on a print medium of the same type as the print medium used for printing the plurality of first patches, and obtaining colorimetry results of the plurality of second patches, wherein the some of the grid points are included in a region of the input color space where a desirable color prediction is not obtained by a linear interpolation using the colorimetry results of the plurality of first patches; and
performing an interpolation calculation to obtain of a colorimetric value of the additional point, based on colorimetric values of grid points around the additional point in the colorimetry results of the plurality of first patches using, as weights, distances on the color space between the colorimetric value of the additional point and the colorimetric values of grid points around the additional point in the colorimetry results of the plurality of second patches.

15. A non-transitory computer-readable medium storing a computer-executable program for causing a computer to perform a color processing method, the method comprising the steps of:
generating patch data corresponding to grid points obtained by dividing an input color space, supplying the patch data to a target printer to print a plurality of first patches corresponding to the respective grid points on a print medium, and obtaining colorimetry results of the plurality of first patches;
generating patch data corresponding to some of the grid points and an additional point between these grid points, supplying the patch data to the target printer to print a plurality of second patches corresponding to the some grid points and the additional point on a print medium of the same type as the print medium used for printing the plurality of first patches, and obtaining colorimetry results of the plurality of second patches, wherein the some of the grid points are included in a region of the input color space where a desirable color prediction is not obtained by a linear interpolation using the colorimetry results of the plurality of first patches; and performing an interpolation calculation to obtain a colorimetric value of the additional point, based on colorimetric values of grid points around the additional point in the colorimetry results of the plurality of first patches using, as weights, differences between components of the colorimetric value of the additional point and components of the colorimetric values of grid points around the additional point in the colorimetry results of the plurality of second patches.

16. A non-transitory computer-readable medium program for causing a computer to perform a color processing method, the method comprising the steps of:

obtaining first measurement results of a first print medium on which a plurality of first patches corresponding to first patch data that respectively correspond to grid points obtained by dividing an input color space are formed;

obtaining second measurement results of a second print medium of the same type as the first print medium on which a plurality of second patches corresponding to some of the grid points and an additional point between these grid points are formed, wherein the some of the grid points are included in a region of the input color space where a desirable color prediction is not obtained by a linear interpolation using the first measurement results; and performing an interpolation calculation to obtain a measurement result of the additional point, based on measurement results of grid points around the additional point in the first measurement results using, as weights, differences between components of the measurement result of the additional point and components of the measurement results of the grid points around the additional point in the second measurement results.

* * * * *